Patented Oct. 31, 1922.

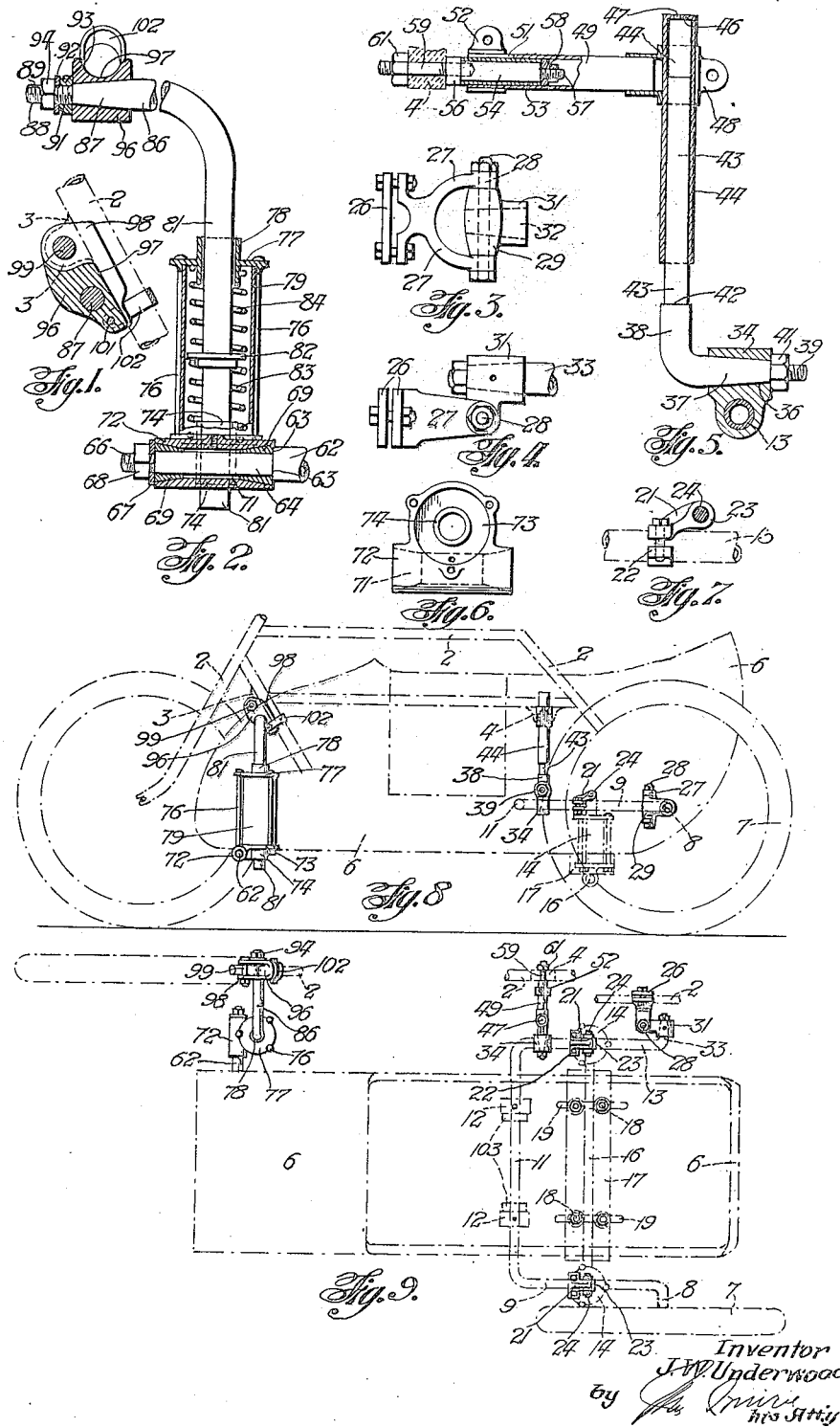

1,434,269

UNITED STATES PATENT OFFICE.

JOHN W. UNDERWOOD, OF MELBOURNE, VICTORIA, AUSTRALIA, ASSIGNOR TO UNDERWOOD PATENT SIDE CAR PROPRIETARY LIMITED, OF MELBOURNE, AUSTRALIA.

SUPPORT OF MOTOR-CYCLE SIDE CARS.

Application filed December 8, 1919. Serial No. 343,400.

(GRANTED UNDER THE PROVISIONS OF THE ACT OF MARCH 3, 1921, 41 STAT. L., 1313.)

*To all whom it may concern:*

Be it known that I, JOHN WALTER UNDERWOOD, a subject of the King of Great Britain and Ireland, residing in the city of Melbourne, in the county of Bourke, State of Victoria, Commonwealth of Australia, and whose post office address is 419 Lonsdale Street, in the said city of Melbourne, have invented certain new and useful Improvements in Supports of Motor-Cycle Side Cars, (for which I have filed applications in the Commonwealth of Australia, September 13, 1918, No. 8652, and June 11, 1919, No. 11,437), of which the following is a specification.

This invention relates to means for supporting motor cycle side cars and for connecting same to the cycle and has particular reference to apparatus of the type described in prior United States Patent No. 1,224,047 wherein the side car is mounted upon inner and outer crank arms or levers, said outer lever carrying the side car wheel whilst the inner lever is connected to the cycle frame, shock absorbers being interposed between said levers and the body of the side car.

The object of the present invention is to improve on the apparatus described in the aforementioned patent, firstly in relation to the intermediate connection between the side car and cycle frame, which connection instead of being attached directly to the side car body is connected to said inner lever and comprises two separate members attached respectively to the cycle frame and the inner lever and adapted to telescope vertically one within the other. Secondly, the invention is directed to improvements in the rear connection by which the rear end of the inner lever is connected to the cycle frame, and thirdly to improvements in the support of the front end of the side car and in the type of front connection. The invention also provides for the attachment of the shock absorbers to the inner and outer levers by longitudinally adjustable brackets whereby the leverage may be regulated to suit passengers of different weights.

Referring to the drawings which form part of this specification:—

Figure 1 is a sectional view of a bed piece by which the front connection is attached to the diagonal front stay of the cycle frame.

Figure 2 is a part sectional front view of the front connection.

Figure 3 is a front view and Figure 4 is a plan of the rear connection.

Figure 5 is a part sectional front view of the intermediate connection.

Figure 6 is a plan of the lower guide plate and sleeve of the front connection.

Figure 7 is a side view of one of the adjustable brackets by which the upper ends of the rear shock absorbers are connected to the inner and outer levers.

Figure 8 is a side elevation showing in full lines the parts of the present invention applied to a side car and cycle which with the levers and other parts previously disclosed are shown in broken lines.

Figure 9 is a plan of Figure 8.

In the drawings, the numeral 2 indicates a cycle frame which is provided with a front lug 3 and intermediate lug 4, said lugs having lateral holes therethrough to accommodate the front and intermediate side car connections, respectively.

A side car body is indicated at 6 and the wheel thereof at 7, said wheel being mounted upon an axle 8 carried by the rear end of an outer crank arm or lever 9 which is connected at its front end to a crank shaft or pivot 11. This crank shaft or pivot is mounted to turn in bearings 12 or the like inside the body of the side car and is provided with collars 10³ or the like. It carries at its inner end an inner crank arm or lever 13.

Shock absorbers 14 which may be constructed in accordance with United States Patent No. 1,224,047 before referred to, are connected at their lower ends to a cross bar 16 which extends beneath the side car body and is mounted upon a wooden block 17. This block is secured to the side car body by adjusting bolts 18 which pass through slots 19 in the bottom of the side car, and permit the cross bar 16 to be adjusted longitudinally in relation to the side car body.

According to the present invention the upper ends of the shock absorbers 14 are connected to longitudinally adjustable brackets 21, each of which is provided with a clamp 22 by which it may be secured in different positions along the inner or outer levers 9 or 13, and with an eye 23 to accommodate the cross pin 24 at the upper end of the shock absorber. Thus by adjusting the brackets 21 and the cross bar 16 along the levers and the side car body respectively, the apparatus may be regulated to support greater or lesser weights.

The present invention also includes a rear connection shown in Figures 3 and 4. This comprises a clamp 26 adapted for attachment to one of the horizontal rear forks of the cycle frame. From one of the clamp members 26 project forked arms 27, between which extends a vertical hinge pin 28. Freely turning upon said hinge pin is a sleeve 29 which carries a socket 31 having a tapered hole 32 therein to rotatably accommodate a lateral extension 33 of the inner crank arm or lever 13. This permits the side car to be swung outwardly away from the cycle upon the hinge pin 28 after the front and intermediate connections have been detached from the cycle frame, thus permitting of ready access to the engine and other parts.

The intermediate connection used in accordance with the present invention includes a bearing 34 which is secured to the inner lever 13 and is provided with a tapered hole 36 to rotatably accommodate the laterally disposed tapered member 37 of an elbow piece, said member 37 being provided with a reduced threaded end 39 to receive a nut 41 whereby it is held to the bearing 34 and permitted to turn therein. The upstanding member 38 of said elbow piece is provided with a step or shoulder 42 above which is a telescoping portion 43 adapted to slide freely within a tube 44 having a closed upper end 46 and an oil hole 47 therethrough to permit of lubrication of the relatively sliding or telescoping members. Fixed to the tube 44 by a vertically adjustable clamp 48 is one end of a laterally disposed tubular arm 49. The other end of this arm is split as at 51 and surrounded by a clamp 52 by which a sleeve 53 is held firmly within the split end of the arm. Rotatably accommodated within the sleeve 53 is a bearing piece 54 having a collar 56 adapted to abut against the end of the sleeve. The inner end of the bearing piece 54 is reduced and threaded as at 57 to accommodate a nut 58 whereby the bearing piece is retained within the sleeve 53 and permitted to turn therein. Secured to the bearing piece 54 is the inner end of a pin 59 which passes through the intermediate lug 4 on the cycle frame and is secured thereto by a nut 61 threaded onto its outer end. The intermediate connection thus described is of especial advantage when used with cycles of the spring frame variety as the telescoping of the members 43, 44 prevents the transmission of road shocks from the rear wheel of the cycle to the rider thereof through the side car connections. The connection also permits of free oscillating movement at the bearing points 34 and 54.

The front connection of the present invention includes a laterally disposed bar 62 which is rigidly attached to the side car and is provided with a step or shoulder 63 forming a journal 64 near its outer end. At the outer end of said journal is a reduced threaded extremity 66 provided with a washer 67 and nut 68. The journal 64 is capable of rotary movement within conical bushes 69 which are secured within the tapered ends of a passage 71 which passes through a sleeve 72 formed integral with a lower guide plate 73. Said lower guide plate is provided with a lower tubular guide 74 and is connected by bolts 76 with an upper guide plate 77 having an upper tubular guide 78. Between the upper and lower guide plates is a cylindrical casing 79.

Passing freely through the upper and lower guides 78 and 74 is a vertical plunger bar or stem 81 to which is fixed a collar 82. Between this collar and the lower guide plate 73 is a lower coiled spring 83, whilst between the upper guide plate 77 and the collar 82 is an upper coiled spring 84. Extending from the upper end of the plunger bar 81 is a lateral arm 86 having a coned portion 87 adjoining which is a reduced threaded end 88. The threaded end 88 is flattened at 89 to form a bearing for the flat portion 91 of a washer 92, to hold said washer against rotation on such threaded end, as is usual in this type of connection. An inner nut 93 is disposed inside said washer and an outer nut 94 outside same.

Rotatably mounted upon the coned portion 87 of the arm 86 is a bed piece 96 through which is a tapered hole to accommodate said coned portion. Formed in said bed piece is a bed 97 to accommodate the diagonal front stay of the cycle frame as seen in Figure 1. The upper or forward end of said bed piece is bifurcated to form a pair of opposite cheeks 98 between which the front lug 3 of the cycle frame is disposed. A cross pin or bolt 99 passes through said cheeks and the lug 3 and thus secures the bed piece to the cycle frame. Attached by a bolt 101 to said bed piece is a U shaped strap 102 which is passed over said diagonal stay as shown, the bolt 101 being then inserted. By the front connection above described, relative vertical movement of the side car and cycle causes the springs 83 or 84 to be compressed, the vertical bar 81 sliding freely through the upper and lower guides 78 and 74 whilst free oscillating movement may take place at the bearing points 64 and 87.

Having now described my invention what I claim as new and desire to secure by Letters Patent is:—

1. In combination with a cycle frame, an inner pivoted arm, a shock absorber associated therewith, a connection pivotally associated at its lower end with the arm and at its upper end with the cycle frame, and sliding means between the ends of the connection.

2. In combination with a cycle frame, an inner pivoted arm, a shock absorber associated therewith, a connection pivotally associated at its lower end with the arm and at its upper end with the cycle frame, and sliding means between the ends of the connection, a front connection including a shock absorber and mounted for pivotal movement with respect to the side car and the cycle frame.

3. In combination with a cycle frame, an inner pivoted arm, a shock absorber associated therewith, a connection pivotally associated at its lower end with the arm and at its upper end with the cycle frame, and sliding means between the ends of the connection, said sliding means being in the plane of the pivotal connections.

4. In combination, a cycle frame, a side car, a bar carried by the side car, a sleeve having conical bushes mounted on the bar, a lower guide plate associated with the sleeve, an upper guide plate, a cylindrical casing disposed between the upper and lower guide plates, a plunger bar passing through the guide plates, upper and lower springs within the casing and associated with the plunger bar, a lateral arm extending from the plunger bar, a bed piece having cheeks embracing the cycle frame, and a U shaped strap embracing the cycle frame, the lateral arm of the plunger bar being pivotally accommodated in the bed piece.

5. In combination, a cycle frame, a side car, a spring controlled arm movably connected to the side car, a connection between said arm and cycle frame and comprising mountings pivotally associated with the arm and with the cycle frame, and an intermediate sliding connection between said mountings.

6. In combination, a cycle frame, a side car, a spring controlled arm movably connected to the side car, a connection between said arm and cycle frame, said connection comprising a section mounted for pivotal movement on said arm and having a vertical extension, a tubular member slidably engaging said extension and having a lateral projection, and a member rotatively held in said projection and adapted for connection with the cycle frame.

7. In combination, a cycle frame, a side car support having a pivoted spring controlled arm, an elbow piece pivotally associated at its lower end with the arm, an upstanding member projecting from the elbow piece, a tube accommodating the upstanding member, a lateral arm attached to the tube, and means for pivotally associating the lateral arm with the cycle frame.

8. In combination, a cycle frame, a pivoted spring controlled arm, a bearing carried by said arm, an elbow piece accommodated in the bearing, an upstanding member projecting from the elbow piece and having a telescoping portion, a tube accommodating the telescoping portion, a lateral arm adjustably attached to the tube, a sleeve disposed within the lateral arm, a bearing piece disposed within the sleeve, and means for securing the bearing piece to the cycle frame.

9. In combination, a side car having a supporting wheel, a pivoted spring controlled arm associated with the side car wheel, a shock absorber associated with the arm, and means for adjusting the absorber relatively to the arm.

10. In combination with a cycle frame, an inner pivoted arm, a shock absorber associated therewith, means for adjusting the absorber relatively to the arm, a connection pivotally associated at its lower end with the arm and at its upper end with the cycle frame, and vertically sliding means disposed between and associating the ends of the connection.

11. In combination, a cycle frame, a pivoted arm, a shock absorber, a longitudinally adjustable bracket connected to the absorber and associated with the arm, a connection having an elbow piece pivotally connected at its lower end to the arm, a tubular element associated with the elbow piece in vertically sliding relationship, and means for pivotally connecting the sliding elements with the cycle frame.

12. In combination, a cycle frame, inner and outer pivotal arms, a side car wheel carried by the outer arm, a shock absorber controlling each arm, means for adjusting each absorber relatively to its arm, a connection pivotally associated at its lower end with the inner arm and at its upper end with the cycle frame, and vertical sliding means disposed between and associating the ends of the connection.

13. In combination, a cycle frame, a side car having a spring controlled pivoted arm, pivoted shock absorbing means for supporting the front end of the side car and connecting it to the cycle frame, a connection pivotally associated at its lower end with the arm and at its upper end with the cycle frame, and vertically sliding means disposed between and associating the ends of the connection.

14. In combination, a cycle frame, a side car, a pivoted arm associated with the side car, a shock absorber associated with the arm, means for adjusting the absorber relatively to the arm, a connection pivotally associated at its lower end with the arm and at its upper end with the cycle frame, vertically sliding means disposed between and associating the ends of the connection, a front connection pivotally associated with the side car and the cycle frame, and a shock absorber associated with the front connection.

15. In combination, a cycle frame, a side car, inner and outer pivotal arms, a side car wheel carried by the outer arm, a shock absorber controlling each arm, means for adjusting each absorber relatively to its arm, a connection pivotally associated at its lower end with the inner arm and at its upper end with the cycle frame, vertically sliding means disposed between and associating the ends of the connection, a front connection pivotally associated with the side car and the cycle frame, and a shock absorber associated with the front connection.

16. In combination, a cycle frame, a side car, means for pivotally connecting one end of the side car to the cycle frame to permit the side car to be swung outwardly from the frame, and shock absorbing means connecting the cycle frame and side car in advance of said connection, said shock absorbing means being adjustable toward and from said means for pivotally connecting one end of the car to the cycle frame to vary the supporting effect of said shock absorbing means.

17. In side car supports, a cycle frame, a side car having an inner pivoted arm, a shock absorber associated therewith, means for adjusting the absorber relatively to the arm, a connection pivotally associated at its lower end with the arm and at its upper end with the cycle frame, vertically sliding means disposed between and associating the ends of the connection, and means for attaching the pivoted arm to the cycle frame whereby the side car may be swung outwardly from the frame upon liberating the connection.

18. In combination, a cycle frame, inner and outer pivotal arms, a side car wheel carried by the outer arm, a shock absorber controlling each arm, means for adjusting each absorber relatively to its arm, a connection pivotally associated at its lower end with the inner arm and at its upper end with the cycle frame, vertically sliding means disposed between and associating the ends of the connection, a rear connection pivotally associating the rear end of the inner arm and the cycle frame, and pivotal means whereby the arms and side car wheel may be outswung from the frame by releasing the sliding connection but without disconnecting the rear connection.

19. In combination, a cycle frame, a side car, a pivoted arm, a shock absorber associated therewith, means for adjusting the absorber relatively to the arm, a connection pivotally associated at its lower end with the arm and at its upper end with the cycle frame, vertically sliding means disposed between and associating the ends of the connection, a rear connection pivotally associating the rear end of the arm and the cycle frame, pivotal means embodied in the rear connection whereby the side car may be outswung from the cycle frame, and pivoted shock absorbing means supporting the front end of the side car and connecting it to the cycle frame.

20. In combination, a cycle frame, a side car, a connection comprising a plunger bar pivotally attached at its one end to the cycle frame and pivotally associated at its other end with the side car, a shock absorber associated with the plunger bar, an inner pivoted arm associated with the side car, a shock absorber controlling the arm, means for adjusting the absorber relatively to the arm, a connection pivotally associated at its lower end with the arm and at its upper end with the cycle frame, vertical sliding means disposed between and associating the ends of the connection, a rear connection pivotally associating the rear end of the inner arm and the cycle frame, and pivotal means embodied in the rear connection whereby the pivoted arm may be outswung with the side car from the cycle frame without disconnecting the rear connection.

21. In combination, a cycle frame, a side car, a front connection comprising a plunger bar pivotally attached at one end to the cycle frame and pivotally associated at the other end with the side car, a shock absorber associated with the plunger rod, inner and outer pivotal arms carried by the side car, a side car wheel carried by the outer arm, a shock absorber controlling each arm, means for adjusting each absorber relatively to its arm, an intermediate connection having an elbow piece pivotally connected at its lower end to the inner arm, a tubular element associated with the elbow piece in vertically sliding relationship, means for pivotally connecting the sliding elements with the cycle frame, a clamp carried by the cycle frame, and a horizontal outswinging socket pivotally attached to the clamp, the rear end of the inner pivoted arm being pivotally accommodated in the socket.

In testimony whereof I affix my signature.

J. W. UNDERWOOD.

Witness:
Cecil W. Le Plastrier.